INVENTOR.
JEAN D. ROCHFORT
BY Donald J. Ellingsberg
AGENT

Feb. 7, 1967  J. D. ROCHFORT  3,302,963
CLAMP FASTENER

Filed Oct. 16, 1964  2 Sheets-Sheet 2

INVENTOR.
JEAN D. ROCHFORT
BY
Donald J. Ellingsberg
AGENT

United States Patent Office 3,302,963
Patented Feb. 7, 1967

3,302,963
CLAMP FASTENER
Jean D. Rochfort, Simi, Calif., assignor to
North American Aviation, Inc.
Filed Oct. 16, 1964, Ser. No. 404,426
6 Claims. (Cl. 287—189.36)

The present invention relates to a new and improved clamp fastener for the rapid joining and quick release of separable parts.

There is a continuing need for improved clamp fasteners to clamp two or more component parts together, particularly in industrial operations. The component parts, for example, can be the separable parts of a mold which generally are held together by C-clamps or by a screw or toggle. These clamp fasteners are not quick-acting for rapid, positive joining and for quick release. Certain industrial operations also require a quick-acting fastener which is suitable for remote operation in a fail-safe manner.

Accordingly, it is an object of the present invention to provide a new and improved clamp fastener.

Another object is to provide a clamp fastener for the rapid joining and quick release of separable parts and the like.

A similar object is to provide a clamp for accurately aligning the separable parts to be joined.

A further object is to provide a clamp which is self-tightening during vibration or movement of the clamped parts.

Briefly, in accordance with one form of the invention, a clamp fastener is provided having a ramp means cooperating with a spring loaded movable member which has a rotational axis so that, under the constant spring urging, the ramp means is moved into a positive clamping engagement. The improved clamp fastener is suitable for joining separable parts wherein a first work part has at least one alignment aperture and wherein each aperture is adapted to receive an associated locator pin that is carried by a second work part. The ramp means is continuously urged by the spring-loaded movable member into clamping engagement with the locator pin so that any vibration or movement of the work parts serves to tighten the clamp.

Rotation of the clamp fastener against the spring urging moves the ramp means away from clamping engagement and permits a quick release of the work parts. The clamp fastener can be restrained at a position away from the clamping engagement by a suitable restraining means such as a detent pin. When the restraining means is released, the spring-loaded movable member again moves the ramp means toward the clamping engagement.

Further objects, features and the attending advantages of the present invention will become readily apparent when the following description is read in conjunction with the accompanying drawings in which.

Figures 1, 2:
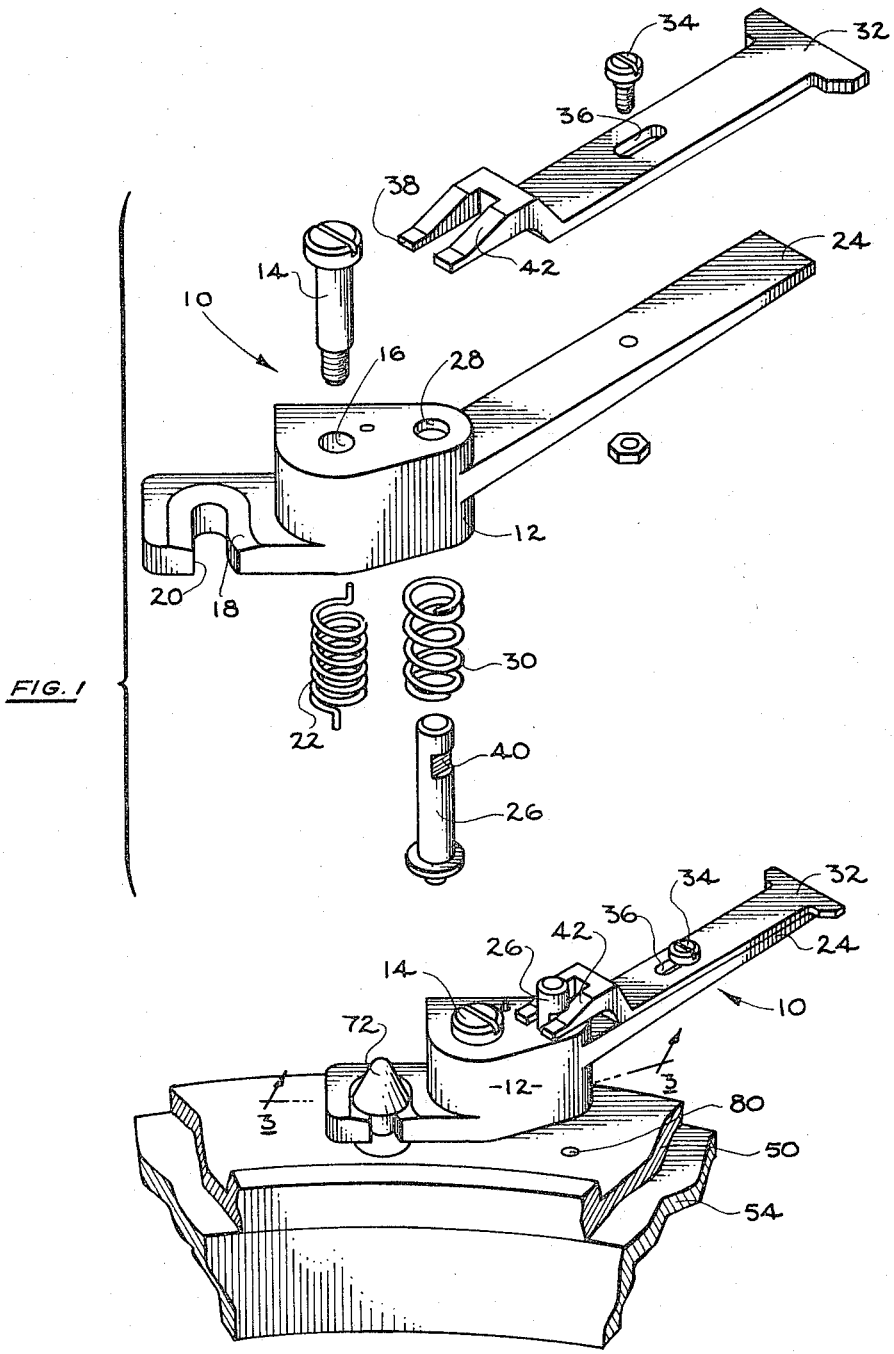
FIGURE 1 is an exploded perspective view of one clamp of the present invention.
FIGURE 2 is a perspective view of the clamp of FIGURE 1 as positioned in an operating location, partly broken away.

Referring to the drawings, and particularly to FIGURE 1, one form of my new and improved clamp fastener 10 has a movable means such as movable body member 12 rotatable about a rotational axis defined by an attachment means such as shouldered cap screw 14 which passes as a slipfit through a clear hole 16 in the movable body member. A ramp means such as ramp surface 18 is suitably formed about the top edge of an open slot 20 which opens into the leading edge of the movable body member 12. Both the ramp surface 18 and the open slot 20 are radially spaced from the rotational axis that is defined by cap screw 14. A spring means such as torsion spring 22 is preferably positioned concentrically about the cap screw 14 to rotate the movable body member 12 and thereby ramp surface 18 and open slot 20 into a clamping engagement.

A radially extending arm 24 of movable body member 12 provides a lever arm to facilitate rotation of the movable body member away from a clamping arrangement. In the embodiment shown by FIGURE 1, the rotation away from a clamping engagement may be limited by a suitable restraining means such as detent pin 26. Detent pin 26 is positioned in a clear bore 28, formed in the movable body member 12, and spring loaded therein by a compression spring 30. A release means such as detent release plate 32 is attached in sliding engagement to arm 24 by a suitable fastener such as machine bolt 34 which passes through a longitudinally extending slot 36 in the detent release plate. A bifurcated end 38 of the detent release plate 32 is adapted to engage a reduced or notched portion 40 of detent pin 26. The bifurcated end 38 of the detent release plate 32 has a suitably formed ramp surface 42. When the detent release plate 32 is moved toward the reduced portion 40 of the detent pin 26, the ramp surface overcomes the force of the compression spring 30 and lifts the detent pin. When the force moving the detent release pin 32 toward the reduced portion 40 is removed, the compression spring 30 moves the detent release plate away from the detent pin 26 as will be hereinafter described.

Figure 3:
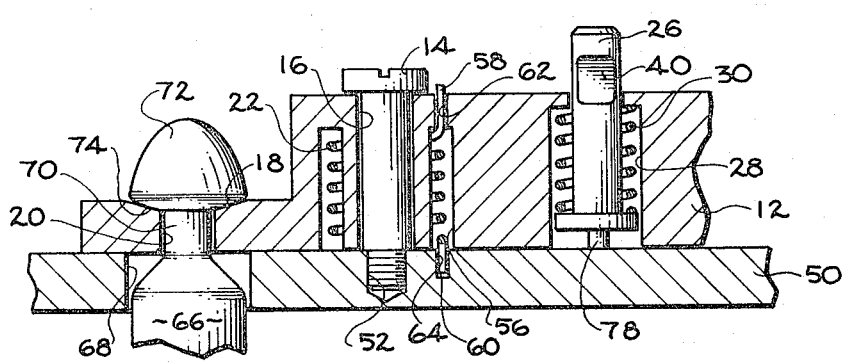
FIGURE 3 is an enlarged sectional view, partly broken away, along the line 3—3 of FIGURE 2.

Referring now to FIGURES 2 and 3, the form of improved clamp fastener 10 as shown by FIGURE 1 is rotatably secured to a first work part 50 by the cap screw 14 which screws into tapped hole 52 in the first work part 50. Torsion spring 22 is positioned within an annular groove 56 formed in movable body member 12 around the clear hole 16. Torsion spring ends 58 and 60 are inserted into aperture 62 in the movable body member 12 and aperture 64 in the first work part 50, respectively. The torsion spring 22 continuously moves the ramp surface 18 and open slot 20 of movable body member 12 into a clamping engagement with an adjustable locator stud 66 carried by the second work part 54. The locator stud 66 passes through an alignment aperture 68 in the first work part 50. The locator stud 66 has a reduced portion 70 which passes into the open slot 20 of movable body member 12. The cap portion 72 of locator stud 66 has an undersurface 74 which cooperates with the ramp surface 18. The cooperation between the ramp surface 18 and the undersurface 74 develops a positive clamping engagement between the separable work parts 50 and 54. The continuous movement of the ramp surface 18 and open slot 20 by the torsion spring 22 into a clamping engagement causes the ramp surface 18 to continually creep towards a more secure clamping engagement with the locator stud 66. Vibration of the work parts or any movement of the work parts enhances the tendency of the ramp surface to creep toward a more secure clamping engagement under the constant force of the torsion spring.

When the ramp surface 18 and open slot 20 of movable body member 12 are moved away from the clamping engagement with locator stud 66 by an external force applied to the radially extending arm portion 24, the detent pin end 78 of detent pin 26 is continuously urged against the first work part 50 by compression spring 30. The necked or reduced portion 40 of the detent pin is pulled down the ramp surface 42 of the detent release plate 32 by the compression spring 30 when the detent pin end 78 is aligned with a limit hole 80 formed in the first work part 50. Limit hole 80 is suitably positioned at a predetermined limit point on the circumferential sweep which is traversed by the detent pin end 78 when the movable member 12 is rotated away from a clamping engagement. When the clamp fastener 10 is restrained in a position away from a clamping engagement by the detent pin 26, an external release force applied to the detent release plate 32 moves the bifurcated end 38 with the cooperating ramp surface 42 towards the reduced portion 40 of the detent pin 26. As the detent release plate 32 moves towards the detent pin 26, the ramp surface 42 overcomes the force of compression spring 30 and lifts the detent pin end 78 from the limit hole 80. Release of the detent pin 26 from the first work part 50 permits the torsion spring 22 to rotate the movable member 12 into a clamping engagement with the locator stud 66 as previously described. It is contemplated that in certain operating positions, the new and improved clamp fastener of my invention would not require a restraining means and as such the detent release plate, the detent pin and the compression spring cooperating therewith, would not be required.

Figure 4:
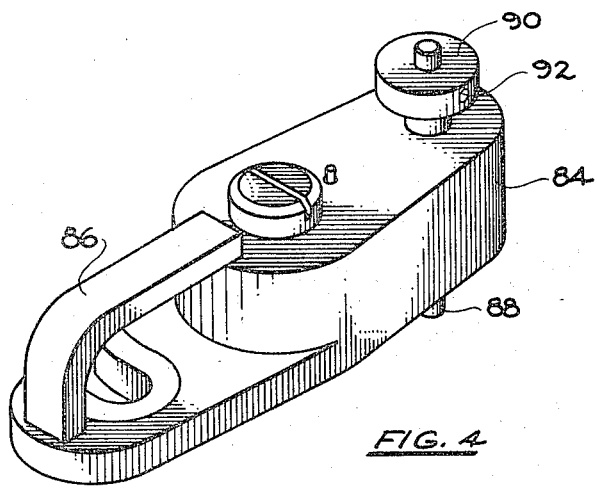
FIGURE 4 is a perspective view of one modification of the clamp fastener of the present invention.

Another form of clamp fastener is shown by FIGURE 4. Like numerals are used for like parts as previously shown and described. A movable member 84 has a lever arm portion 86 to permit rotation of the movable member away from a clamping engagement under the urging of a suitable spring means such as the previously described torsion spring of FIGURES 1 through 3. A spring-loaded detent pin 88 has a release collar 90 suitably secured to the opposite end of the detent pin by a locking key or pin 92. Release of the detent pin 88 is accomplished by lifting the release collar 90. Upon the release of the detent pin 88, movable member 84 is again moved toward a clamping engagement by the spring means cooperating therewith.

As will be evidenced from the foregoing description, certain aspects of my invention are not limited to the particular details of the constructions as illustrated, and it is contemplated that other modifications and applications will occur to those skilled in the art. It is, therefore, intended that the appended claims shall cover such modifications and applications that do not depart from the true spirit and scope of the invention.

What I claim as new and desire to secure by Letters Patent of the United States is:

1. A clamp fastener comprising:
   (a) movable means having a rotational axis,
   (b) ramp means cooperating with said movable means,
   (c) said ramp means spaced from and selectively movable about the rotational axis in a first and a second direction,
   (d) spring means cooperating with said movable means and moving said ramp means about the rotational axis in the first direction,
   (e) restraining means cooperating with said movable means and limiting movement of said ramp means about the rotational axis in the second direction, and
   (f) release means carried by said movable means and cooperating with said restraining means to selectively disengage said restraining means so that said unrestrained spring means moves said ramp means in the first direction.

2. A clamp fastener comprising:
   (a) a rotatable first member having a rotational axis,
   (b) at least one open slot in said first member radially spaced from the rotational axis,
   (c) a ramp about said open slot selectively movable with said first member in a first and a second direction,
   (d) spring means cooperating with said first member and moving said ramp in the first direction,
   (e) a detent means carried by said first member,
   (f) a release lever carried by said first member selectively disengaging said detent means so that said spring means moves said ramp in the first direction.

3. The clamp fastener of claim 2 in which said ramp extends outwardly and rearwardly from the leading edge opening of said slot.

4. The clamp fastener of claim 2 in which said spring means is a torsion spring cooperating with said first member.

5. An improved clamp fastener for joining separable work parts wherein a first work part is adapted to receive a locator pin carried by a second work part, the clamp fastener comprising:
   (a) a first member carried by the first work part and having a rotational axis,
   (b) an open slot in said first member radially spaced from the rotational axis,
   (c) a first ramp about said slot extending generally outwardly and rearwardly from the leading edge opening of said slot,
   (d) said first ramp and slot movable about said rotational axis in a first direction into and in a second direction away from a clamping engagement with the locator pin,
   (e) a torsion spring cooperating with said first member and positioned about the rotational axis urging said first ramp and slot in the first direction into the clamping engagement with the locator pin,
   (f) a spring-loaded detent pin carried by said first member,
   (g) said detent pin cooperating with the first work part and limiting movement of said first ramp and slot about the rotational axis in the second direction way from the clamping engagement with the locator pin,
   (h) a detent release plate carried by said first member and movable between a first unlocked position and a second locked position, and
   (i) a suitably formed detent ramp on said release plate cooperating with said detent pin so that said detent ramp selectively engages said detent pin and substantially overcomes said spring-loaded detent pin in the first unlocked position, whereby said torsion spring continuously moves said first ramp and slot in the first direction into clamping engagement with the locator pin so that any vibration of movement of the work parts tightens the clamping engagement, and selectively disengages said pin in the second locked position.

6. The clamp fastener of claim 5 in which said detent ramp is bifurcated.

References Cited by the Examiner

UNITED STATES PATENTS

| | | | |
|---|---|---|---|
| 556,932 | 3/1896 | Keeler | 292—304 |
| 1,386,671 | 8/1921 | Zych | 292—207 |
| 2,733,089 | 1/1956 | Grevengoed | 292—207 X |

HARRISON R. MOSELEY, *Primary Examiner.*

P. M. CAUN, *Assistant Examiner.*